United States Patent [19]

Sorkin

[11] Patent Number: 5,436,425
[45] Date of Patent: Jul. 25, 1995

[54] METHOD AND APPARATUS FOR PLASMA CABLE CUTTING

[76] Inventor: Felix L. Sorkin, General Technologies, Inc., 4115B Greenbriar Dr., P.O. Box 1503, Stafford, Tex. 77477

[21] Appl. No.: 265,832

[22] Filed: Jun. 27, 1994

[51] Int. Cl.⁶ .................................... B23K 10/00
[52] U.S. Cl. ......................... 219/121.44; 219/121.39; 219/121.59; 219/121.48; 219/78.15
[58] Field of Search ............... 219/121.39, 121.59, 219/121.44, 121.48, 121.36, 78.15; 52/230, 223 L

[56] References Cited

U.S. PATENT DOCUMENTS

| | | | |
|---|---|---|---|
| 4,806,726 | 2/1989 | Rosa et al. | 219/121.67 |
| 4,831,231 | 5/1989 | Pelle | 219/121.39 |
| 4,896,470 | 1/1990 | Sorkin | 52/230 |
| 5,072,558 | 12/1991 | Sorkin et al. | 52/230 |

Primary Examiner—Mark H. Paschall
Attorney, Agent, or Firm—Vinson & Elkins

[57] ABSTRACT

A method and apparatus area disclosed for utilizing a plasma cutting torch to sever the free ends of a post-tensioned cable embedded in a concrete body. The method and apparatus utilize a positioning element for interconnecting the head of a plasma cutting torch and the cable to be severed, with the positioning element conforming in shape to a pocket or recess in a concrete body, from which the cable to be cut extends.

11 Claims, 2 Drawing Sheets

METHOD AND APPARATUS FOR PLASMA CABLE CUTTING

FIELD OF THE INVENTION

The present invention relates to a method and apparatus for cutting cables, especially post-tensioned cables used in concrete structures, utilizing a plasma cutting torch.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is extremely weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly in such post-tensioning operations, there are provided anchors for anchoring the ends of the cables suspended therebetween. In the course of installing the cable tensioning anchor assembly in a concrete structure, a hydraulic jack or the like is releasably attached to one of the exposed ends of cable for applying a predetermined amount of tension to the tendon. When the desired amount of tension is applied to the cable, wedges, threaded nuts, or the like, are used to capture the cable and, as the jack is removed from the tendon, to prevent its relaxation and hold it in its stressed condition.

Metallic components within concrete structures may become exposed to many corrosive elements, such ad de-icing chemicals, sea water, brackish water, or spray from these sources, as well as salt water. If this occurs, and the exposed portions of the cable or anchor suffer corrosion, then they may become weakened due to this corrosion. The deterioration of the anchor or tendon can cause the cables to slip, thereby losing the compressive effects on the structure, or the anchor can fracture. In addition, the large volume of by-products from the corrosive reaction is often sufficient to fracture the surrounding structure. These elements and problems can be sufficient so as to cause a premature failure of the post-tensioning system and a deterioration of the structure.

Several U.S. patents have considered the problem of anchor and cable corrosion. For example, U.S. Pat. Nos. 4,896,470, Felix L. Sorkin, Inventor, and 5,072,558, issued Dec. 17, 1991, Felix L. Sorkin, et al., Inventors, disclose cable tensioning anchor systems in which the metal anchor for the system is encapsulated in plastic and has a tubular portion extending outwardly towards the surface of the post-tensioned concrete body. A sealing cap is fitted to the end of the tubular portion of the plastic encapsulation to provide a fluid-tight seal for protecting the post-tensioned cable, anchor and tensioning wedges from exposure to the elements. Other prior art systems also exist in which the end of the post-tensioned cable is severed at a point inwardly from the outer surface of the post-tensioned concrete body and means are used to protect the cable end, anchor and tensioning wedges from exposure to the elements.

When using such prior art systems for corrosion protection of the tensioning cable and related apparatus, it is important that the cable be terminated at a point inboard from the outside surface of the post-tensioned concrete body. This requires that the end of the cable be cut just outboard of the tensioning wedges, and within the pocket or cavity formed by the anchor. The method most commonly used in the prior art for cutting the tensioned cable at this position is a conventional acetylene torch or cutting torch. However, use of the open flame of a torch creates some danger of fire or explosion in the surrounding environment. Also, cutting the metal cable with a torch at a point near to the tensioning wedges causes the cable and wedges to become heated and may result in a loss of temper of the metal or loosening of the post-tensioning wedges.

An alternate prior art method sometime used for cutting the cable in this area is a conventional electric saw. However, this requires that a portion of the slab or other concrete structure surrounding the anchor also be cut in order to reach the portion of the cable which is within the concave bowl of the anchor.

It is, therefore, the primary object of the present invention to provide a method and apparatus for severing the free end of a post-tensioned cable or tendon at a point near the tensioning wedges and within the depth of the bowl or pocket formed for the anchor member.

Another object is to provide such a method and apparatus in which the cable is cut without substantially heating the cable and tensioning wedges.

A still further object is to provide such a method and apparatus in which the cable can be cut at the desired location without damaging the post-tensioned concrete body.

BRIEF DESCRIPTION OF THE DRAWINGS

These and other objects and advantages of the invention will become apparent from the following specification and from the accompanying drawings in which like numerals indicate like parts and in which.

DETAILED DESCRIPTION OF THE INVENTION

Figure 1:
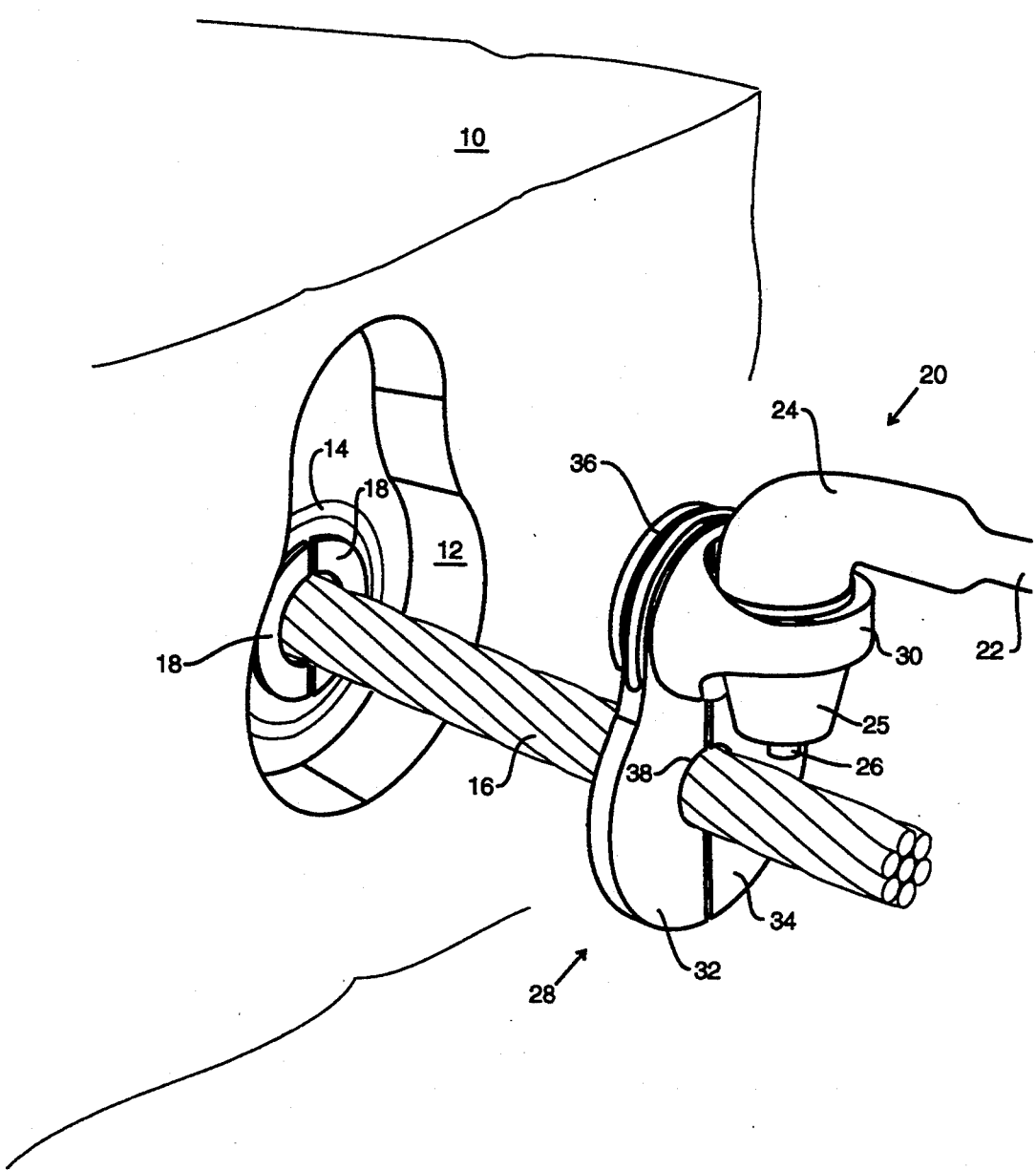
FIG. 1 is a perspective view of a concrete structure with a post-tensioned cable and anchor recessed therein and illustrating the method and apparatus for using a plasma cutting torch to sever the cable at a point inboard of the outer edge of the concrete structure.
Figure 2:
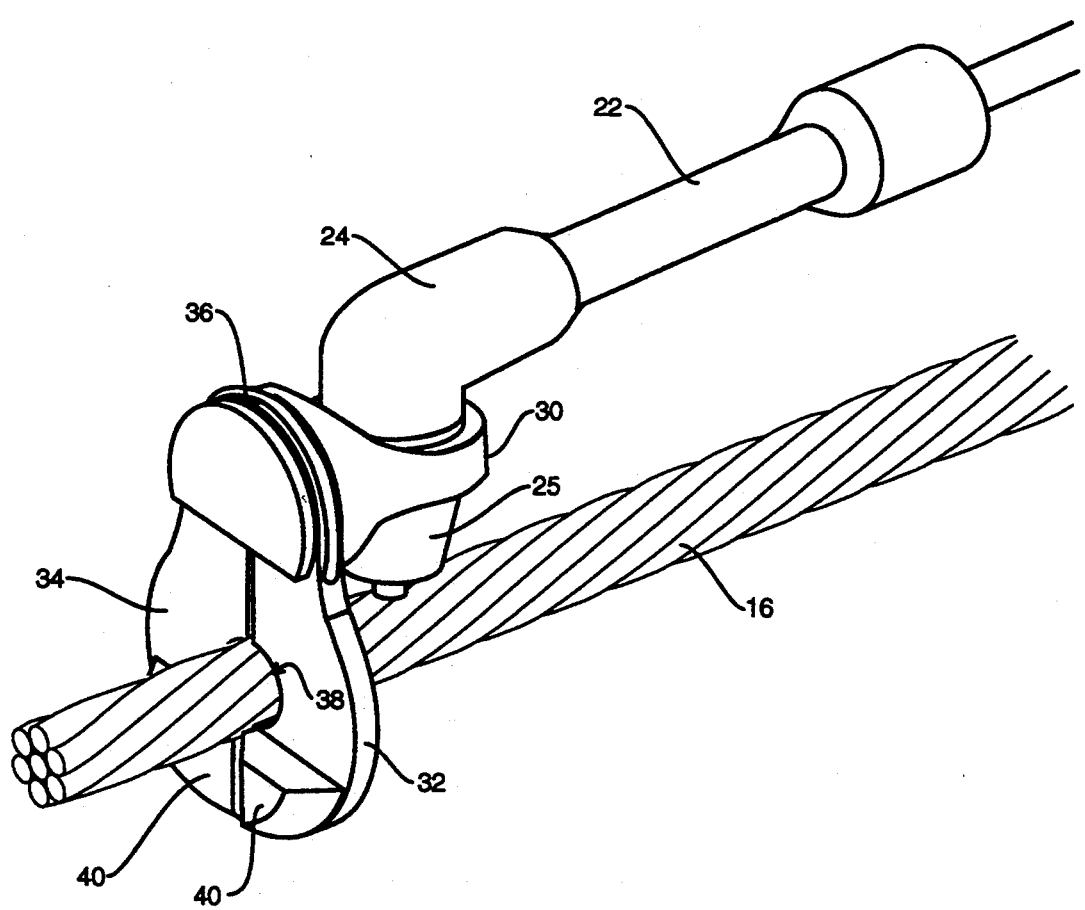
FIG. 2 is a detailed view, in perspective, of the cutting torch head and attachment of FIG. 1.

Referring to FIG. 1, there is shown a concrete slab or other concrete structure 10. A pocket or recess 12 is formed in the end of the slab 10. A post-tensioning anchor 14 is disposed at the inside face of the pocket. Post-tensioned wire cable 16 is imbedded in the concrete structure 10. Its free end extends through the anchor and is held in place by wedges 18 seated in the bowl of anchor 14 and gripping the post-tensioned cable 16 in the usual manner.

In order that the metal anchor 14, wedges 18 and post-tensioned cable 16 can be protected from the elements, it is desirable to sever the cable 16 within the depth of the pocket 12, near to the face of the cable gripping wedges 18. For this purpose, there preferably is provided a plasma cutting torch 20. The torch 20, only a part of which is shown, is a prior art device which utilizes an air compressor, an electrical power source and electrodes to generate a stream of air, nitrogen or other gaseous plasma at very high temperatures of about 3,000° C.–5,000° C. or more. The stream of superheated gaseous plasma will cut through metal more quickly than an acetylene torch.

The plasma cutting torch shown includes a handle 22, head 24, and cutting tip 26. A ceramic heat shield 25 surrounds a portion of the tip 26. The remaining portions of the torch, not shown, would include a compressor, cylinder or other source for the gas to be formed into the plasma, a source of electrical power and an electrode for converting the gas into a gaseous plasma. The electrode may be disposed in the handle or the head, or in another portion of the plasma torch. A superheated stream of gaseous plasma is discharged from the tip, and generally can cut through metal objects. During cutting, the plasma tip is bent quite close to the surface being cut, the specific desired spacing between the cutting tip and the surface, as well as the thickness of metal which the torch will cut, will vary from case to case. Plasma torches are available from a variety of sources and in a variety of types and sizes.

Since the cutting depth of the plasma torch is restricted, and since the cutting will be done inside the pocket 12 in close proximity to the anchor 14, means are provided for accurately positioning the cutting tip of the plasma torch with regard to both the cable 16 to be cut and the anchor 14.

In the preferred embodiment, the positioning means comprise a combination clamp and shield member 28 which is releasably engagable with the cable 16. The clamp 28 includes an attachment means or bracket 30 which is engagable with the cutting head of plasma torch 20. The attachment bracket 30 may be appropriately sized to be friction fitted around the cutting head 24 or may be permanently attached to the cutting head or the heat shield 25 surrounding the tip 26. Positioning means are attached to the bracket 30 and are releasably engagable with the cable to be cut for positioning the cutting tip a predetermined distance from the longitudinal axis of the cable. In the preferred embodiment, these comprise a pair of depending jaws 32, 34 pivotally attached to the mounting bracket 30 and biased towards a closed position by resilient means comprising a spring clip 36. The jaws 32, 34 each has a semicircular relieved portion 38 at its inner edge which, together, provide a circular opening through which the cable 16 may be received. The bottom portion of each jaw has an upwardly and inwardly sloping area 40 which provide biasing means for urging the jaws open when the closed jaws are pushed against the cable. Once the cable is received in the center opening, the jaws will close around it.

The two jaws 32, 34, when closed around the cable 16 also act as shield means for protecting the anchor 14 and wedges 18 from any hot metal splatter during the cutting operation. The jaws are shaped to conform to the opening of the pocket 12.

In use, the jaws are engaged around the post-tensioned cable 16, outside the pocket 12, and are biased into a closed position by the spring clip 36. The jaws, with the cutting torch head 24 attached pivotally to them by the bracket 30, may then be moved longitudinally along the cable until they are received within the pocket 12. The cutting tip 26 then will be properly positioned both angularly and longitudinally of the cable 16 and anchor 14 for cutting the cable 16 at the pre-determined optimum point for subsequent placement of a sealing cap. Since the jaws 32, 34 and mounting bracket 30 are pivotally connected, it is possible, during the cutting operation, to rotate the plasma tip through an arc substantially perpendicular to the longitudinal axis of the cable to assure that the plasma stream cuts the entire thickness of the cable. The severed end of the cable, plasma cutting torch and clamp may then be removed so that the metal anchor, wedges and end of the tensioned cable 16 may be encapsulated as described above for protection from corrosion.

In the preferred embodiment, as shown and described, the recess or pocket 12 is shaped asymmetrically to permit pivoting of the cutting torch attached to the clamp/shield 28, so that the plasma stream may be rotated through an arc for cutting the entire cable, while the clamp/shield remains fixed in the conforming pocket 12. The asymmetrically shaped pocket 12 has a small upper portion for receiving the cutting torch head, and a larger lower portion for permitting rotation of the cutting tip through an area of approximately 90° (about 45° on each side of the longitudinal axis of the cable). Such shape produces a pocket of minimal volume, and therefore requires less grout for subsequent filling and sealing of the pocket to protect the cable end, anchor and wedges from the elements. Alternatively, if the means for attaching the head of the cutting torch to the clamp/shield does not permit pivoting of the torch, or if the pocket in the concrete structure is not found in an asymmetrical shape to conform to and guide the positioning means, the entire cutting torch could be rotated about the cable 16 to produce the same result. However, this would require that the pocket 12 be made substantially larger, since it would be necessary to describe a larger arc with the head of the plasma cutting torch. This should be a less efficient design, since it would require a larger pocket former to cast the pocket 12, as well as more grout to fill and seal the pocket after the cable has been cut.

The foregoing disclosure and description of the invention is illustrative only, and various changes may be made in the size shape and materials of construction, within the scope of the appended claims, without departing from the spirit of the invention.

What is claimed is:

1. An apparatus for positioning a plasma cutting torch to cut off the free end of a post-tensioned cable embedded in a concrete body, said apparatus comprising:

attachment means releasably engagable with the head of a plasma cutting torch of the type having a plasma cutting tip attached thereto; and positioning means attached to said attachment means and releasably engagable in surrounding relationship to said free end of said cable to be cut, for positioning said cutting tip a pre-determined distance from the longitudinal axis of said cable, and for providing resistance to movement of said cutting tip toward and away from said longitudinal axis of said cable, said apparatus being configured to conform to the shape of a recess in the surface of the said concrete body, from which recess said free end of said cable extends, whereby when said attachment means is engaged with said head of said plasma cutting torch and said positioning means is engaged with said free end of said cable to be cut, said cutting tip of said plasma cutting torch may be positioned a pre-determined distance from the longitudinal axis of said cable and in a pre-determined angular and longitudinal relationship to said recess, when said plasma cutting torch is activated to cut said cable.

2. The apparatus according to claim 1 wherein said positioning means is pivotally attached to said attachment means, whereby when said plasma cutting torch is activated to cut said cable, said cutting tip may be rotated with respect to said positioning means through an arc substantially perpendicular to the longitudinal axis of said cable, to assure that the entire thickness of said cable is cut.

3. The apparatus according to claim 1 wherein said positioning means comprise a pair of jaws pivotally connected to said attachment means and adapted to be received around the outside diameter of said free end of said cable, and comprising additionally:

resilient means for urging said jaws into a closed position; and biasing means for urging said jaws open, to permit said cable to be received there between, when said jaws are positioned adjacent to the outside diameter of said cable and are moved towards said cable.

4. An apparatus for cutting off the free end of a post-tensioned cable imbedded in a concrete body, said apparatus comprising:

a plasma cutting torch having a cutting head with a cutting tip thereon; and positioning means attached to said head of said plasma cutting torch and releasably engagable in surrounding relationship to said free end of said cable to be cut, for positioning said cutting tip a pre-determined distance from the longitudinal axis of said cable;

said positioning means being configured to conform to the asymmetrical shape of a recess in the surface of said concrete body, from which asymmetrical recess said free end of said cable extends, whereby said cutting tip of said plasma cutting torch may be positioned a pre-determined distance from the longitudinal axis of said cable and in a pre-determined angular and longitudinal relationship to said recess so that, when said plasma cutting torch is activated to cut said cable, said cutting tip will be spaced an appropriate distance from said cable and said cable will be cut at a pre-determined point in said recess.

5. The apparatus according to claim 4 wherein said positioning means is pivotally attached to said head of said plasma cutting torch so that said cutting tip may be rotated with respect to said positioning means through an arc substantially perpendicular to the longitudinal axis of said cable to assure that the entire diameter of said cable is cut.

6. The apparatus according to claim 4 wherein said positioning means comprise a pair of jaws having their outer edges shaped to conform to the shape of said recess and having their inner edges shaped to conform to the outside diameter of said cable, and comprising additionally:

resilient means for urging said jaws into a closed position; and biasing means for urging said jaws open against the force of said resilient means to permit said cable to be received there between when a compressive force is exerted between said biasing means and said cable.

7. A method for utilizing a plasma cutting torch to cut off the free end of a post-tensioned cable embedded in a concrete structure, said free end of said post-tensioned cable extending from a shaped recess in the surface of said structure, said method comprising:

providing a plasma cutting torch having a cutting head and a cutting tip for producing and directing a plasma stream capable of cutting said cable;

providing a positioning means attached to said cutting head and releasably engagable in surrounding relationship to said cable to be cut, for positioning said cutting tip a pre-determined distance from the longitudinal axis of said cable and a predetermined distance along the longitudinal axis of said cable from the point where said cable enters said concrete structure;

engaging said positioning means in surrounding relationship to said cable to thereby position said cutting tip of said plasma torch a pre-determined distance from the longitudinal axis of said cable;

advancing said positioning means and head of said plasma cutting torch longitudinally along said cable until said positioning means is received within and engages a wall of said recess, and cannot advance further longitudinally along said cable to thereby position said cutting tip at a pre-determined point longitudinally of said cable and within said recess; and activating said plasma cutting torch to generate a plasma cutting stream, whereby said plasma cutting stream will cut said cable within said recess, at said pre-determined point.

8. The method according to claim 7 wherein said positioning means is pivotally attached to said head of said plasma cutting torch so that when said cutting tip is positioned by said positioning means with respect to said cable, said cutting tip may be rotated with respect to said positioning means through an arc substantially perpendicular to the longitudinal axis of said cable, and comprising additionally the step of rotating said cutting tip through an arc substantially perpendicular to longitudinal axis of said cable while said plasma cutting torch is activated to generate a plasma cutting stream, so as to assure that said cable is completely cut by said plasma stream.

9. In the method of forming a post-tensioned concrete structure utilizing a post-tensioned steel cable engaged with an anchor embedded in said structure, the improvement comprising forming an asymmetrical pocket in said structure in surrounding relationship to said cable for permitting access to said anchor and to a free end of said post-tensioned cable, said asymmetrical pocket having a first portion sized and configured to accommodate the head of a cutting torch, so that the cutting tip of said cutting torch will be positioned to sever said cable within said pocket and in proximity to said anchor, said asymmetrical pocket having a second portion, said second portion being larger than said first portion and being sized and configured to permit a cutting stream of heated gases from the tip of a cutting torch to be rotated through an arc of at least about 90° perpendicular to the longitudinal axis of said cable, without damaging impingement of said stream of cutting gases on the walls of said pocket.

10. The method according to claim 9 wherein said asymmetrical pocket is substantially pear shaped, when viewed in a cross section perpendicular to the longitudinal axis of said cable.

11. The method according to claim 9 wherein said larger portion of said asymmetrical pocket is substantially centered on the longitudinal axis of said cable.

* * * * *